United States Patent
Lupin et al.

(10) Patent No.: US 11,509,621 B2
(45) Date of Patent: **\*Nov. 22, 2022**

(54) UI AND DEVICES FOR RANKING USER GENERATED CONTENT

(71) Applicant: Snap Inc., Santa Monica, CA (US)

(72) Inventors: Gabriel Lupin, Marina del Rey, CA (US); Vasileios Verroios, San Francisco, CA (US); Yan Wu, Milbrae, CA (US)

(73) Assignee: Snap Inc., Santa Monica, CA (US)

( \* ) Notice: Subject to any disclaimer, the term of this patent is extended or adjusted under 35 U.S.C. 154(b) by 180 days.

This patent is subject to a terminal disclaimer.

(21) Appl. No.: 16/704,565

(22) Filed: Dec. 5, 2019

(65) Prior Publication Data
US 2020/0183943 A1 Jun. 11, 2020

Related U.S. Application Data

(60) Provisional application No. 62/775,822, filed on Dec. 5, 2018, provisional application No. 62/775,829, filed on Dec. 5, 2018.

(51) Int. Cl.
*G06F 16/43* (2019.01)
*G06F 16/90* (2019.01)
(Continued)

(52) U.S. Cl.
CPC .......... *H04L 51/52* (2022.05); *G06F 3/04817* (2013.01); *G06F 16/24578* (2019.01);
(Continued)

(58) Field of Classification Search
None
See application file for complete search history.

(56) References Cited

U.S. PATENT DOCUMENTS 10,394,827 B2   8/2019   Stickler et al.
2006/0253458 A1\*  11/2006   Dixon ................. G06F 16/9538
(Continued)

FOREIGN PATENT DOCUMENTS

CN           113168425 A      7/2021
WO    WO-2017106960 A1 \*   6/2017   ............. G06F 16/00
(Continued)

OTHER PUBLICATIONS

"International Application Serial No. PCT/US2019/064676, International Search Report dated Feb. 17, 2020", 3 pgs.
(Continued)

*Primary Examiner* — Son T Hoang
(74) *Attorney, Agent, or Firm* — Schwegman Lundberg & Woessner, P.A.

(57) ABSTRACT

The systems and methods include operations for: storing, by one or more processors, a plurality of content items in association with a content item generation template, each of the plurality of content items having been previously generated by a respective user of a plurality of users of a messaging application in accordance with instructions associated with the content item generation template; ranking the plurality of content items associated with the content item generation template; receiving input that selects an identifier of the content item generation template; and displaying the ranked plurality of content items to a given user of the messaging application in response to receiving the input.

19 Claims, 11 Drawing Sheets

(51) Int. Cl.

| | | |
|---|---|---|
| *G06F 16/24* | (2019.01) | |
| *G06F 16/95* | (2019.01) | |
| *H04L 51/52* | (2022.01) | |
| *G06F 21/31* | (2013.01) | |
| *G06T 19/00* | (2011.01) | |
| *H04L 51/04* | (2022.01) | |
| *G06F 16/438* | (2019.01) | |
| *G06F 16/9035* | (2019.01) | |
| *G06F 16/2457* | (2019.01) | |
| *G06F 16/9538* | (2019.01) | |
| *G06F 40/186* | (2020.01) | |
| *G06F 3/04817* | (2022.01) | |
| *H04L 9/40* | (2022.01) | |

(52) U.S. Cl.
CPC ........ *G06F 16/438* (2019.01); *G06F 16/9035* (2019.01); *G06F 16/9538* (2019.01); *G06F 21/31* (2013.01); *G06F 40/186* (2020.01); *G06T 19/006* (2013.01); *H04L 51/04* (2013.01); *H04L 63/08* (2013.01)

(56) References Cited

U.S. PATENT DOCUMENTS

| | | | |
|---|---|---|---|
| 2008/0215964 A1 | 9/2008 | Abrams et al. | |
| 2009/0248677 A1* | 10/2009 | Grynberg | G06F 16/9535 |
| 2010/0153520 A1* | 6/2010 | Daun | G06F 16/24578 |
| | | | 709/218 |
| 2010/0228712 A1* | 9/2010 | Wexler | G06F 16/951 |
| | | | 707/706 |
| 2013/0218968 A1 | 8/2013 | Mcevilly et al. | |
| 2013/0262420 A1* | 10/2013 | Edelstein | G06F 16/20 |
| | | | 707/695 |
| 2013/0268490 A1* | 10/2013 | Keebler | G06F 16/9535 |
| | | | 707/627 |
| 2014/0278968 A1 | 9/2014 | Strompolos et al. | |
| 2014/0351686 A1* | 11/2014 | Yawn | G06F 16/438 |
| | | | 715/230 |
| 2015/0324886 A1 | 11/2015 | Hurst et al. | |
| 2016/0085729 A1* | 3/2016 | Chi | G06F 16/9035 |
| | | | 715/202 |
| 2016/0179975 A1* | 6/2016 | Kao | G06F 16/9558 |
| | | | 707/728 |
| 2016/0314608 A1* | 10/2016 | Dixon | G06F 16/245 |
| 2016/0349894 A1 | 12/2016 | Savenok et al. | |
| 2017/0069349 A1 | 3/2017 | Muyal et al. | |
| 2017/0372170 A1 | 12/2017 | Young et al. | |
| 2018/0070026 A1 | 3/2018 | Nussbaum et al. | |
| 2018/0253901 A1* | 9/2018 | Charlton | G06F 16/95 |
| 2018/0308524 A1 | 10/2018 | Muyal et al. | |
| 2019/0245903 A1 | 8/2019 | Wallenstein et al. | |
| 2019/0386951 A1 | 12/2019 | Uhll | |
| 2020/0186489 A1 | 6/2020 | Chen et al. | |

FOREIGN PATENT DOCUMENTS

| | | | | |
|---|---|---|---|---|
| WO | WO-2018104834 A1 * | 6/2018 | ............ | G06F 16/00 |
| WO | 2018165154 | 9/2018 | | |
| WO | 2020118050 | 6/2020 | | |

OTHER PUBLICATIONS

"International Application Serial No. PCT/US2019/064676, Written Opinion dated Feb. 17, 2020", 6 pgs.

"U.S. Appl. No. 16/704,668, Non Final Office Action dated Apr. 2, 2021", 16 pgs.

"International Application Serial No. PCT/US2019/064676, International Preliminary Report on Patentability dated Jun. 17, 2021", 8 pgs.

"U.S. Appl. No. 16/704,668, Response filed Apr. 22, 2022 to Non Final Office Action dated Jan. 25, 2022", 14 pgs.

"U.S. Appl. No. 16/704,668, Advisory Action dated Dec. 7, 2021", 3 pgs.

"U.S. Appl. No. 16/704,668, Final Office Action dated Oct. 1, 2021", 19 pgs.

"U.S. Appl. No. 16/704,668, Non Final Office Action dated Jan. 25, 2022", 22 pgs.

"U.S. Appl. No. 16/704,668, Response filed Jun. 23, 2021 to Non Final Office Action dated Apr. 2, 2021", 11 pgs.

"U.S. Appl. No. 16/704,668, Response filed Nov. 24, 2021 to Final Office Action dated Oct. 1, 2021", 13 pgs.

U.S. Appl. No. 16/704,668, filed Dec. 5, 2019, UI and Devices for Incenting User Contribution to Social Network Content.

* cited by examiner

UI AND DEVICES FOR RANKING USER GENERATED CONTENT

CLAIM FOR PRIORITY

This application claims the benefit of priority to U.S. Provisional Application Nos. 62/775,822, filed Dec. 5, 2018; and 62/775,829, filed Dec. 5, 2018, which are herein incorporated by reference in their entireties.

TECHNICAL FIELD

The present disclosure generally relates to the technical field of social networks. In particular, the present embodiments are generally directed to incenting a user of a social network to provide content to the social network.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
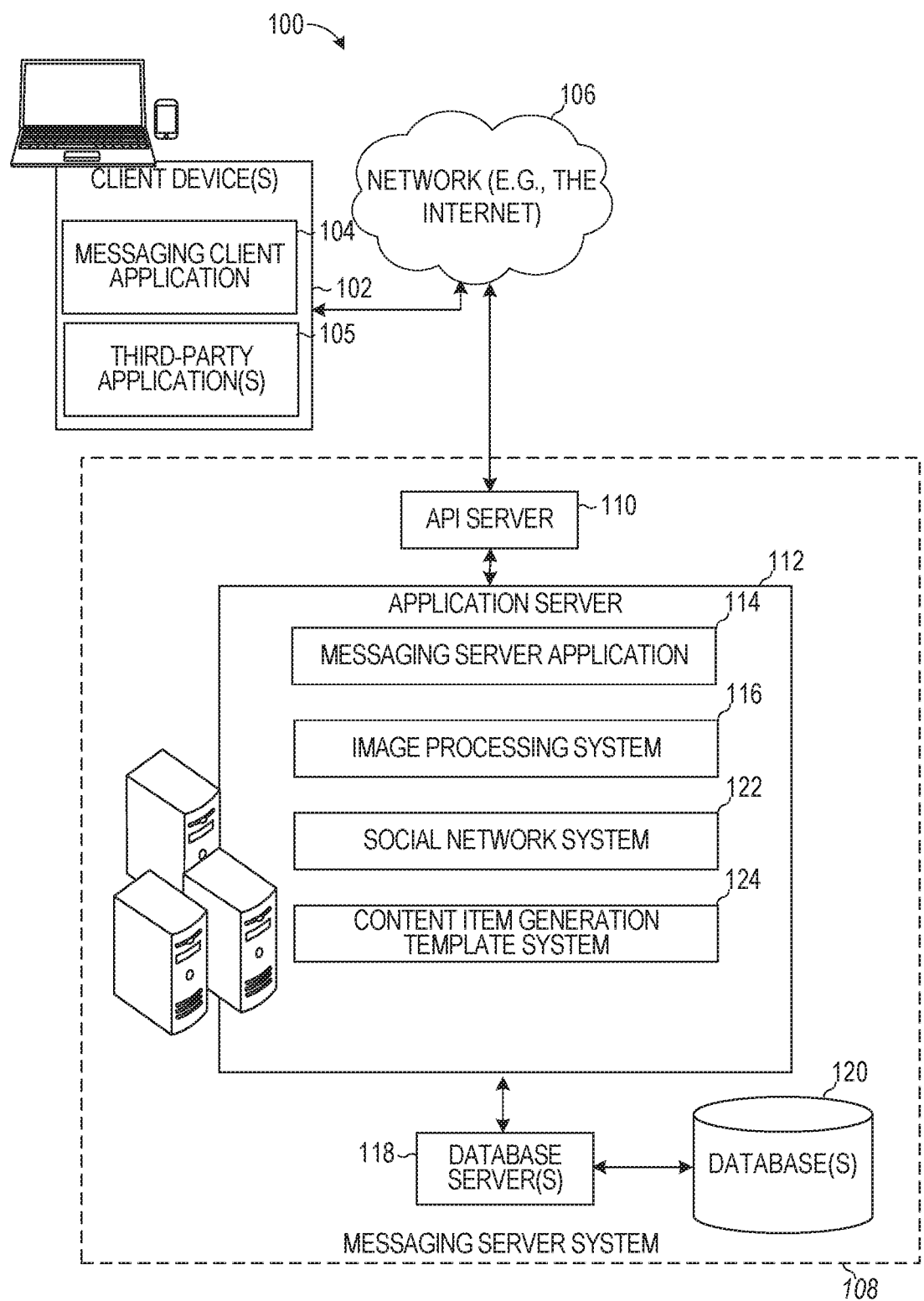
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on their mobile device. Users are always seeking new ways to discover content. Sometimes users generate content using predefined graphics or audio content. In certain cases, users may be interested in finding such content that was generated using the predefined graphics or audio content. In order to do so, the users have to manually search through and view various content submitted by other users and manually determine whether such content includes the predefined graphics or audio content. This task is extremely burdensome and time consuming, which ends up frustrating users and wasting device resources.

The disclosed embodiments improve the efficiency of using the electronic device by providing a system that automatically organizes content based on themes used to generate the content. Specifically, the disclosed system allows a user to browse through content on the basis of whether such content was generated using a predefined content item generation template. For example, a content item generation template that is associated with instructions for generating a content item is identified and a messaging application displays an identifier of the content item generation template. The messaging application receives input that selects the identifier of the content item generation template and retrieves a plurality of content items associated with the content item generation template. Each of the plurality of content items has been previously generated by a respective user of a plurality of users of the messaging application in accordance with the instructions associated with the content item generation template. The messaging application displays the retrieved plurality of content items associated with the content item generation template.

According to example embodiments, there is provided a challenge mechanism (or mechanic) for a messaging system, according to which users of the messaging system are enabled to create and submit content (e.g., user generated content (UGC) such as photographs or video), to the messaging system having a specific annotation or supplementation (e.g., an image overlay or full site) corresponding to a particular challenge theme (e.g., a content item generation template). These user generated content collections may relate to any one of a number of different events or themes, such as music, social events, holidays, comedy, and so forth. While example embodiments discussed herein are discussed with respect to a musical theme, it will be appreciated that challenges (content item generation templates) may be applied with respect to a number of different themes. The challenge mechanic seeks to drive user engagement with the messaging system, and also to expand creative expression, for example by facilitating the convenient and automated generation of content (e.g., UGC). In some embodiments, the messaging system allows users to view UGC that was generated for a particular theme or according to instructions of a particular content item generation template.

In this way, the disclosed embodiments improve the efficiency of using the electronic device by reducing complexity experienced by a user in finding certain content that is of interest to the user, and by reducing the number of screens and interfaces a user has to navigate through to find such content. This reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a content item generation template system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

In some embodiments, the messaging client application 104 provides a user with a graphical user interface that allows the user to search for content that corresponds to a particular content item generation template and/or submit content generated using instructions of the content item generation template. For example, the messaging client application 104 may present a graphical user interface with an identifier of a content item generation template (also referred to as a challenge or lens challenge). The content item generation template may be created by an artist or producer and may have one or more augmented reality content (e.g., music, videos, graphical element(s), text, and the like) associated with it. The content item generation template includes a set of instructions that are presented to a user for generating content according to a theme of the content item generation template.

For example, when the content item generation template is accessed, the content item generation template starts playing a song and allows the user to capture a video or record audio together with or in place of a portion of the song. The user can use a slice tool provided by the messaging client application 104 to select a portion of the song that is included in the content item generation template over which the user's voice or audio is recorded. Specifically, the content item generation template may include a three minute song, and the user can select a segment between the time points 1:30 (min:sec) and 1:45 (min:sec) of the song to be replaced by the user's personal audio recording.

As another example, the content item generation template may include augmented reality content that represents a particular scene. Specifically, the content item generation template may include one or more graphical elements that look like the Academy Awards (e.g., a stage, a podium, a screen, and audience). The content item generation template may include instructions for the user to capture a video of the user making a speech at the Academy Awards. The video including the user's face is overlaid or combined with the graphical elements and specifically behind the podium. In this way, the content item generated by the user looks like the user is making a speech at the Academy Awards.

As another example, the content item generation template may include a musical composition that is combined with one or more graphical elements. The graphical elements are time stamped such that a different one of the graphical elements is presented on the screen at different time points in the musical composition. The content item generation template may instruct the user to capture video of the user while the musical composition is played and while the graphical elements are presented. For example, the user can sing lyrics corresponding to the musical composition, and graphical elements may be overlaid on top of the user singing the lyrics in correspondence with different portions of the musical composition.

Once the user is satisfied with the content item the user generates according to the content item generation template, the messaging client application 104 allows the user to submit the generated content to one or more designated friends or recipients and/or to be shared as part of all the content items associated with the content item generation template. For example, the messaging client application 104 provides a first option for the user to share the generated content item with one or more friends and provides a second option for the user to enable access to the generated user generated content item by any user of the messaging client application 104 who selects an identifier of the content item generation template. Namely, selection of the second option adds the content item generated by the user to the collection of UGC that is associated with the given content item generation template.

In some embodiments, the instructions of the content item generation template presented to the user for generating a content item are only included and presented to the user while the content item is being generated. After the content item is generated and shared with other users, the instructions are removed or not displayed with the content item. For example, the content item generation template may overlay instructions over a video feed being captured by the user. The instructions may instruct the user to perform some action (e.g., sing lyrics, position a camera a certain way, or make a dance move). The instructions, in some cases, may include text of lyrics of a song that is associated with the content item generation template. After the user completes capturing the video according to the displayed instructions, the video is stored without the instructions. Namely, another user who views or accesses the video that was created by the user while the instructions were presented may see the video without seeing the instructions. For example, the content item generation template may overlay lyrics of a song for a user to sing while capturing audio or video of the user. After the audio or video is captured, the lyrics are removed from the video and/or are not stored as part of the video. In this way, another user does not see the lyrics being presented while viewing the video or audio of the user singing the lyrics of the song.

In some embodiments, the messaging client application 104 receives a user input selecting an identifier of a given content item generation template. Specifically, the messaging client application 104 presents a list of different content item generation templates. The list may be vertically oriented or horizontally oriented. The user can browse the list by swiping left/right (for horizontally oriented lists) or up/down (for vertically oriented lists). Once the user finds a content item generation template that is of interest, the user can tap on the identifier of the content item generation template. In response, the messaging client application 104 may present a set of UGC that was generated according to the instructions of the selected content item generation template.

In some embodiments, the set of UGC that is presented corresponding to the selected content item generation template may be ranked. In some implementations, the set of UGC is ranked based on attributes of the user viewing the set of UGC and a set of attributes of the users who created the UGC. For example, the UGC may be ranked and sorted based on a geographical region of the user who is viewing the UGC and the geographical region of the users who created the UGC. Specifically, if the user is in California, the messaging client application 104 may present a set of UGC that was generated according to the instructions of the content item generation template by users in California. In some implementations, the UGC is ranked based on a relationship between the user who submitted the UGC and the user who is viewing the UGC. For example, a UGC that is generated by the user's friend may be positioned higher or earlier in the set of UGC than another UGC that was generated by a user who is not a friend. In some implementations, the set of UGC is ranked based on a number of content items that are associated with the content item generation template.

In some embodiments, the set of UGC is ranked based on a combination of moderator input and engagement signals. For example, the set of UGC is ranked based on whether a moderator assigned a high or low rank to a given one of the UGC items and at least one of a number of times the given content item has been viewed by users of the messaging client application 104, length of time the users spend viewing the given content item, a geographical location of the users who view the given content item, or how recently the given content item was received.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the content item generation template system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the content item generation template system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The content item generation template system 124 allows users to view, browse, search for, and submit content items associated with one or more content item generation templates. The content item generation template system 124 allows an artist or producer to create and submit a content item generation template. For example, the artist or producer may provide an identifier including a graphical representation (e.g., cover art) of the content item generation template. The artist or producer may also input various parameters of the content item generation template including one or more of a period of time during which content will be collected from users, one or more conditions for ending collection of content, a name of the user generated content collection, an image to be displayed when a user views the user generated content collection, a music or video asset to present as part of generating the content item, and a trigger to modify one or more graphics presented during generation of the content item according to designated time points.

After receiving the content item generation template from the artist or producer, the content item generation template system 124 adds the received identifier to a list of content item generation templates presented to a user of the messaging client application 104. The content item generation template system 124 may allow users to join or submit content to the content item generation template and/or view content previously submitted for the content item generation template. The content item generation template system 124 automatically ranks the content items submitted for a given content item generation template according to one or more criteria.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
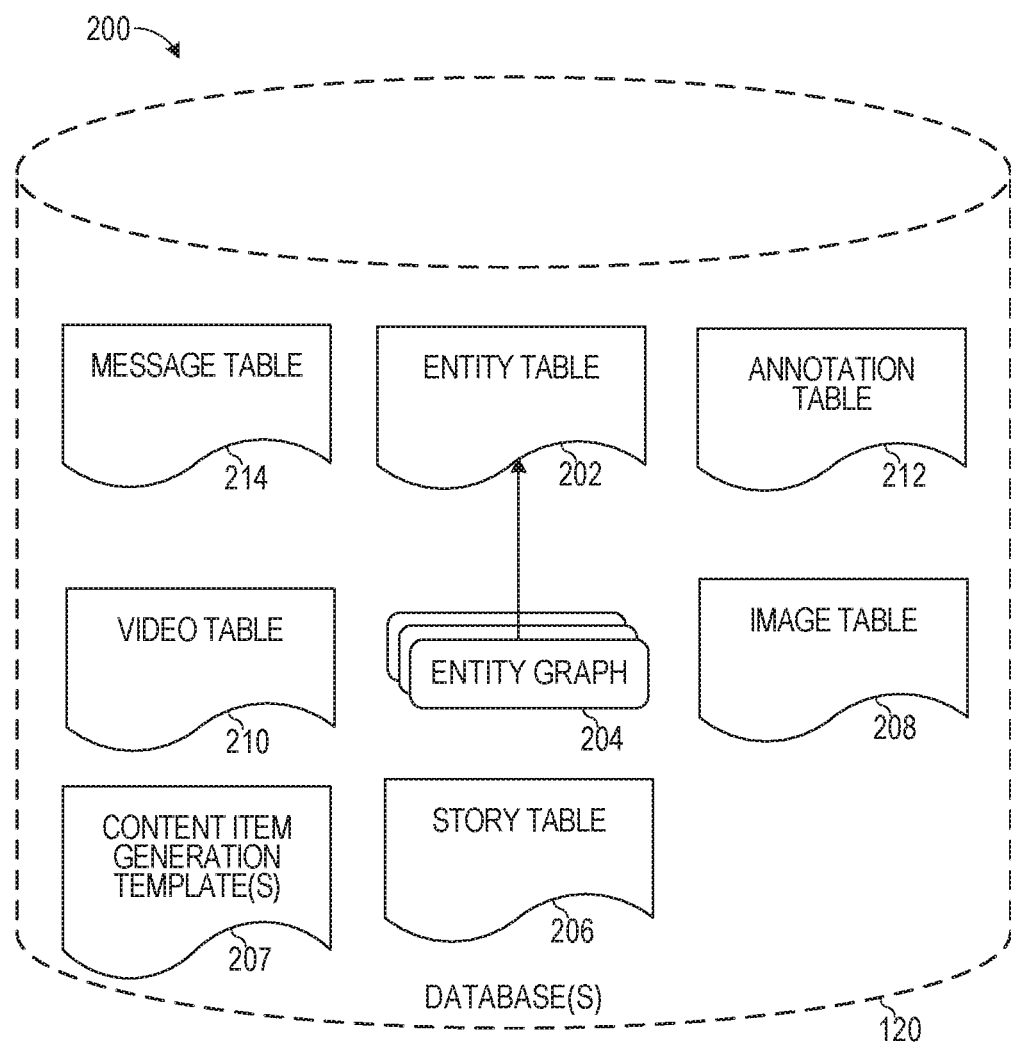
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (UPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Content item generation template(s) 207 stores one or more content item generation templates. Each of the content item generation template(s) 207 is associated with a particular theme. Namely, each of the content item generation template(s) 207 includes a different set of instructions and/or augmented reality content that is presented to assist users to generate content corresponding to the theme of the content item generation template 207. As an example, a music theme based content item generation template 207 may present a musical composition to the user and/or lyrics corresponding to the musical composition. The music theme based content item generation template 207 may instruct the user to sing one or more of the presented lyrics and automatically record video of the user singing the lyrics. In some cases, the music theme based content item generation template 207 may present audio of the musical composition and the singer and presents a slicer tool that allows the user to designate one or more portions for which to replace the singer's voice with the user's voice.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
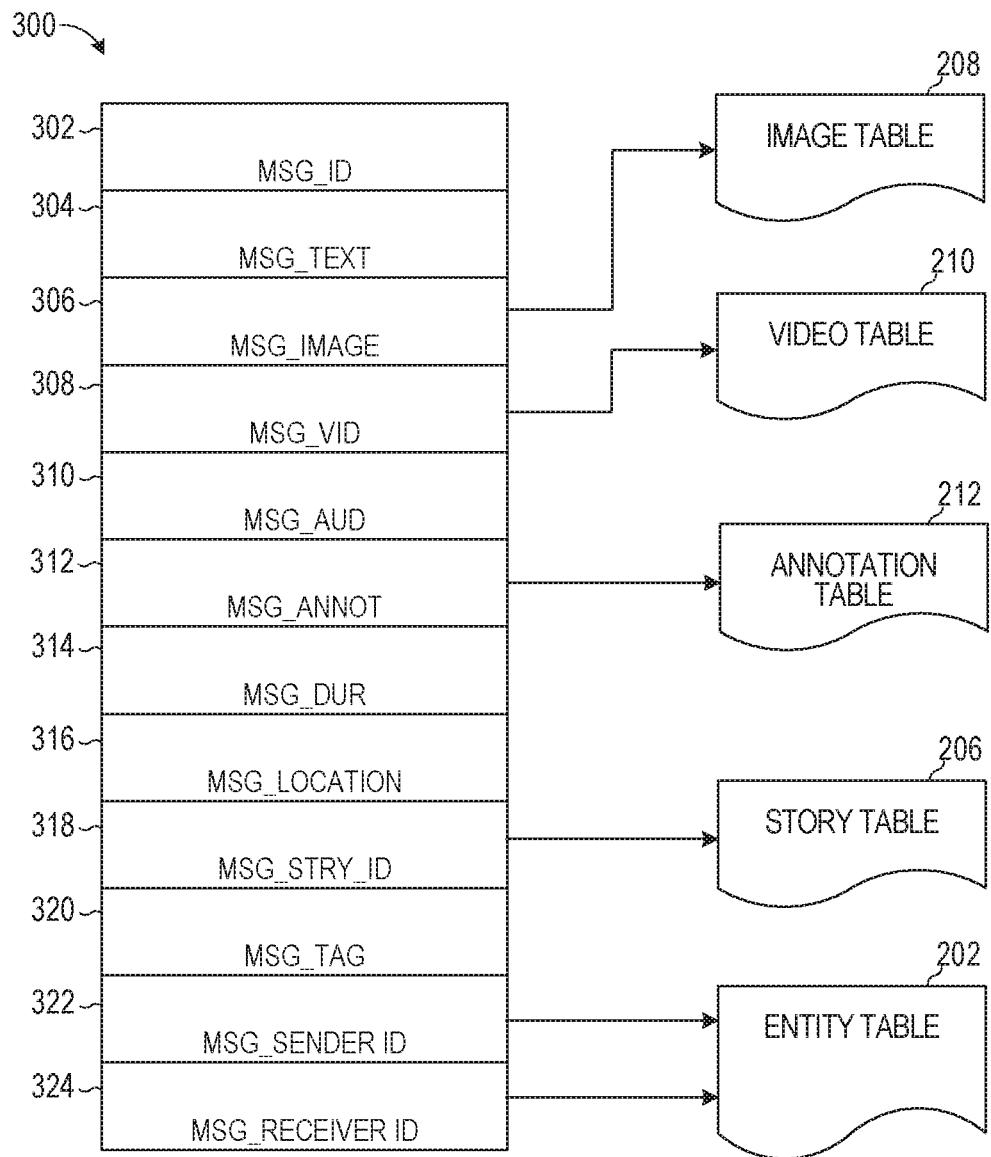
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
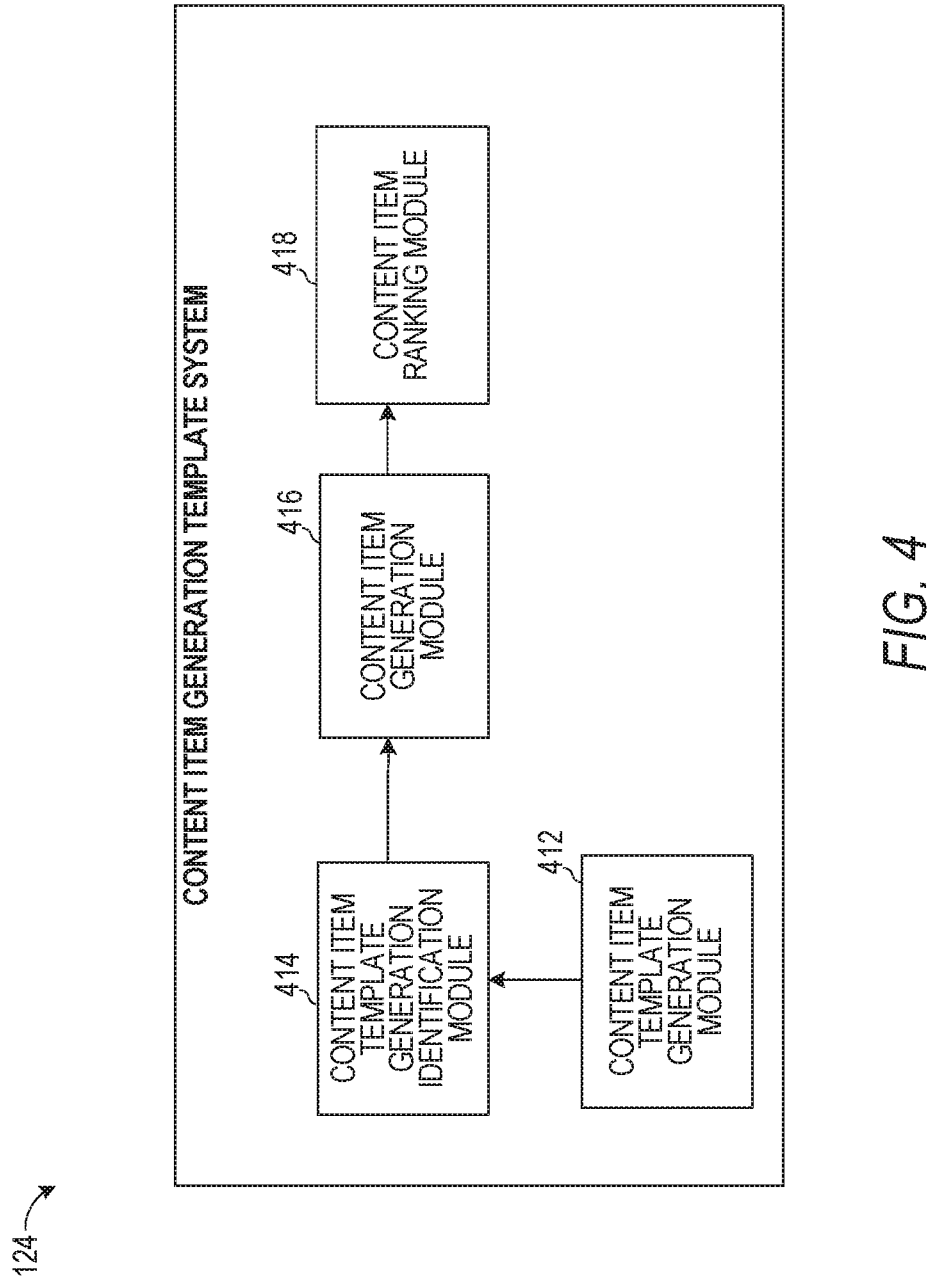
FIG. 4 is a block diagram showing an example content item generation template system, according to example embodiments.

FIG. 4 is a block diagram showing an example content item generation template system 124, according to example embodiments. Content item generation template system 124 includes a content item template generation module 412, a content item template generation identification module 414, a content item generation module 416, and a content item ranking module 418.

Content item template generation module 412 allows an artist or producer to create and/or submit a content item generation template. The artist or producer logs into the content item generation template system 124 to establish a first authentication session using authentication credentials of the artist or producer. In some implementations, the first authentication session includes administrative privileges to the content item generation template submitted by the artist or producer associated with the authentication credentials. The content item template generation module 412 displays a configuration user interface in the first authentication session that allows the artist or producer to provide input parameters for defining the instructions associated with the content item generation template submitted by the artist or producer.

For example, the content item template generation module 412 presents a graphical user interface that allows the artist or producer to upload a graphical representation of the content item generation template and one or more of a period of time during which content will be collected from users, one or more conditions for ending collection of content, a name of the user generated content collection, an image to be displayed when a user views the user generated content collection, a music or video asset to present as part of generating the content item, and a trigger to modify one or more graphics presented during generation of the content item according to designated time points. Specifically, the artist or producer may upload a song for the content item generation template and lyrics of the song. As another example, the artist or producer may upload a song with instructions for the user to perform one or more actions during one or more portions of the song while the song is played back on a user device.

In some cases, the artist or producer may only allow content to be generated and submitted to the collection associated with the content item generation template during a period of time (e.g., between a start time and an end time). When the identifier of the content item generation template is presented before or after the period of time, selection of the identifier may inform the user about the details of the instructions associated with the template but may not allow the user to activate and generate content using the template. When the identifier of the content item generation template is presented to a user during the period of time, the user can select an option to join or submit content to be associated with the template. In response to selection of the option, the content item generation template is activated and launched together with a camera feed of the user device. The user can view the instructions of the template and create content using the camera feed to be shared with other users. In some embodiments, when the identifier of the content item generation template is presented to a user during the period of time, the user can select the identifier to view content submitted by other users using the template.

In some cases, the artist or producer may only allow content to be generated and submitted to the collection when conditions are satisfied. For example, the conditions may specify a maximum number of content items to be created. Once the maximum number is reached, selection of the identifier may inform the user about the details of the instructions associated with the template but may not allow the user to activate and generate content using the template. Before the maximum is reached, the user can select an option to join or submit content to be associated with the template.

After the artist or producer completes creating and submitting the content item generation template, the content item template generation module 412 stores the content item generation template as part of the content item generation template(s) 207.

Content item template generation identification module 414 presents to users of the messaging client application 104 content item generation templates stored in the content item generation template(s) 207. In some embodiments, the content item template generation identification module 414 sorts the templates that are presented to a user in a list based on popularity, age of the template, size, number of content items submitted to the given template, or other suitable criteria. For example, the content item template generation identification module 414 may determine that a first content item generation template is associated with 50 content items that were previously generated by users using the first content item generation template. The content item template generation identification module 414 may determine that a second content item generation template is associated with 80 content items that were previously generated by users using the first content item generation template. In such cases, the content item template generation identification module 414 may position the second content item generation template earlier in the list than the first content item generation template.

In some cases, the content item template generation identification module 414 may rank the templates using weighted attributes. For example, a popularity attribute may be associated with a higher weight than a number of content items attribute. In such cases, the first content item generation template, which may be more popular than the second content item generation template, may be ranked higher and positioned earlier in the list than the second content item generation template even though the second content item generation template is associated with a greater number of content items than the first content item generation template.

The content item template generation identification module 414 presents the list of content item generation templates to a user of the messaging client application 104. The list of content item generation templates may be presented in a dedicated portion of the display while other content items organized by other criteria are presented in other portions of the display. Each content item generation template is represented in the list by an identifier that indicates the theme of the template, the artist or producer of the template, and that includes options for submitting content to the template.

For example, a given content item generation template may include an option to join the template when an insufficient number of content items (e.g., content items less than a threshold) (or no content items) have previously been created and submitted by other users using the content item generation template. The join option may be selected by the user to activate the content item generation template and a camera feed of the user device to create content using the template. In some embodiments, any content item generation template that is included in the list may be removed at any time if a popularity of the content item generation template falls below a threshold or if the content item generation template reaches a certain age.

In other cases, when a threshold number of content items have been previously created and submitted by other users using the content item generation template, the identifier may include a representation of the number of content items that are associated with the template. Selection of the number may present to the user a list of the previously generated content that was generated using the template by other users. While the user is browsing or viewing the list, the user can tap a camera icon to automatically launch and activate the template to generate content using the content item generation template.

In response to receiving a user selection of an identifier of a content item generation template, the content item template generation identification module 414 retrieves the instructions of the template from content item generation template(s) 207. The instructions may include any augmented reality content associated with the template. The content item template generation identification module 414 provides the instructions and the identified template to the content item generation module 416. Content item generation module 416 launches and activates the template and activates a camera feed of the user device to allow the user to generate a content item corresponding to the selected content item generation template.

In some embodiments, the augmented reality content associated with the template and instructions are automatically presented and launched once the content item generation module 416 activates the template and the camera feed. For example, the content item generation module 416 may automatically start presenting a video feed being captured by the front or rear-facing camera of the user device. The instructions of the template may indicate whether the front or rear-facing camera of the user device should be activated. The content item generation module 416 may start playing back a music composition or track that is associated with the template and may present lyrics according to the time stamps of the lyrics and the music track. The content item generation module 416 may also automatically begin storing the video feed being captured. Once the music composition ends, the content item generation module 416 may stop storing the video feed and present options for the user to modify the captured video and/or share the captured video with designed recipients and/or to associate the video with the selected content item generation template.

In some embodiments, the content item generation module 416 may start presenting a video feed from the front or rear-facing camera of the user device and may present an identifier of the activated template. The content item generation module 416 may await user confirmation before starting to present the instructions and/or augmented reality content associated with the content item generation template. For example, after the user selects a start option on the screen, then the content item generation module 416 may begin playing back a music composition or track that is associated with the template and may present lyrics according to the time stamps of the lyrics and the music track. The content item generation module 416 may also begin storing the video feed being captured. Once the music composition ends, the content item generation module 416 may stop storing the video feed and present options for the user to modify the captured video and/or share the captured video with designed recipients and/or to associate the video with the selected content item generation template.

In some embodiments, according to the template instructions, the content item generation module 416 may present one or more graphical elements at different time points within a given interval of time. For example, the content item generation module 416 may present a first graphical element at a first time point and a second graphical element at a second time point. The content item generation module 416 may capture the video feed being received from the front or rear-facing camera and combine the captured feed with the presented graphical elements. The content item generation module 416 may display instructions for the user to perform one or more actions before, during, or after the graphical elements are presented. The actions may be captured by the camera feed and, at the end of the interval of time, the content item generation module 416 may present options for the user to share the captured video. In some embodiments, the instructions are only included and displayed to the user while capturing the video and are not included in the video that is captured and shared with other users. Namely, the user may see the instructions to perform a sequence of actions being displayed on the screen while the video is being captured but after the video is captured and stored, the video of the user performing the actions is shared with other users without displaying the instructions to the other users.

In some embodiments, the content item ranking module 418 receives a video that is generated using a given content item generation template. The content item ranking module 418 presents the video to a moderator. The moderator provides input that confirms that the video matches a theme of the template and depicts content corresponding to the instructions of the template. The moderator then assigns a manual rank (e.g., high or low rank) to the video and adds the video to a collection of content items associated with the given content item generation template.

The content item ranking module 418 analyzes various engagement factors for each content item in the collection associated with the given content item generation template. The content item ranking module 418 combines the engagement factors with the manually assigned rank of each content item to generate a rank for each content item. The content item ranking module 418 sorts the content items in the collection associated with the given content item generation template according to the assigned ranks. In some cases, the engagement factors depend on the user who is requesting to view a given collection. In such cases, the collection of content items presented to a first user may be ranked differently and ordered differently than the same collection of content items presented to a second user. For example, the first user in a first geographical region may see the collection of content items ordered differently and ranked differently than the second user in a second geographical region.

As another example, the content item ranking module 418 assigns a greater rank and weight to content items submitted by a user's friends than content items submitted by other users of the messaging client application 104. This way, a given user sees content items generated using a given content item generation template that were submitted by the given user's friends before content items submitted by other users. In some implementations, a threshold number (e.g., 10) of the most popular content items from popular user accounts are presented at and ranked higher than all other content items in a collection of content items associated with a given content item generation template. Specifically, the content item ranking module 418 retrieves an identifier of each user who submits a given content item to a collection of content items associated with the content item generation template. The content item ranking module 418 determines popularity of the users who submitted content items by looking at how active the user is on the messaging client application 104, the number of followers the user has, and/or the number of friends of the user. The content item ranking module 418 ranks content items of users who have a popularity rating that exceeds a given threshold, higher than other users who have a lower popularity rating. In addition, the content item ranking module 418 presents a representation (e.g., a name or avatar) of such users who have been determined to be popular and who submitted the content items to the collection for the content item generation template.

Figure 5:
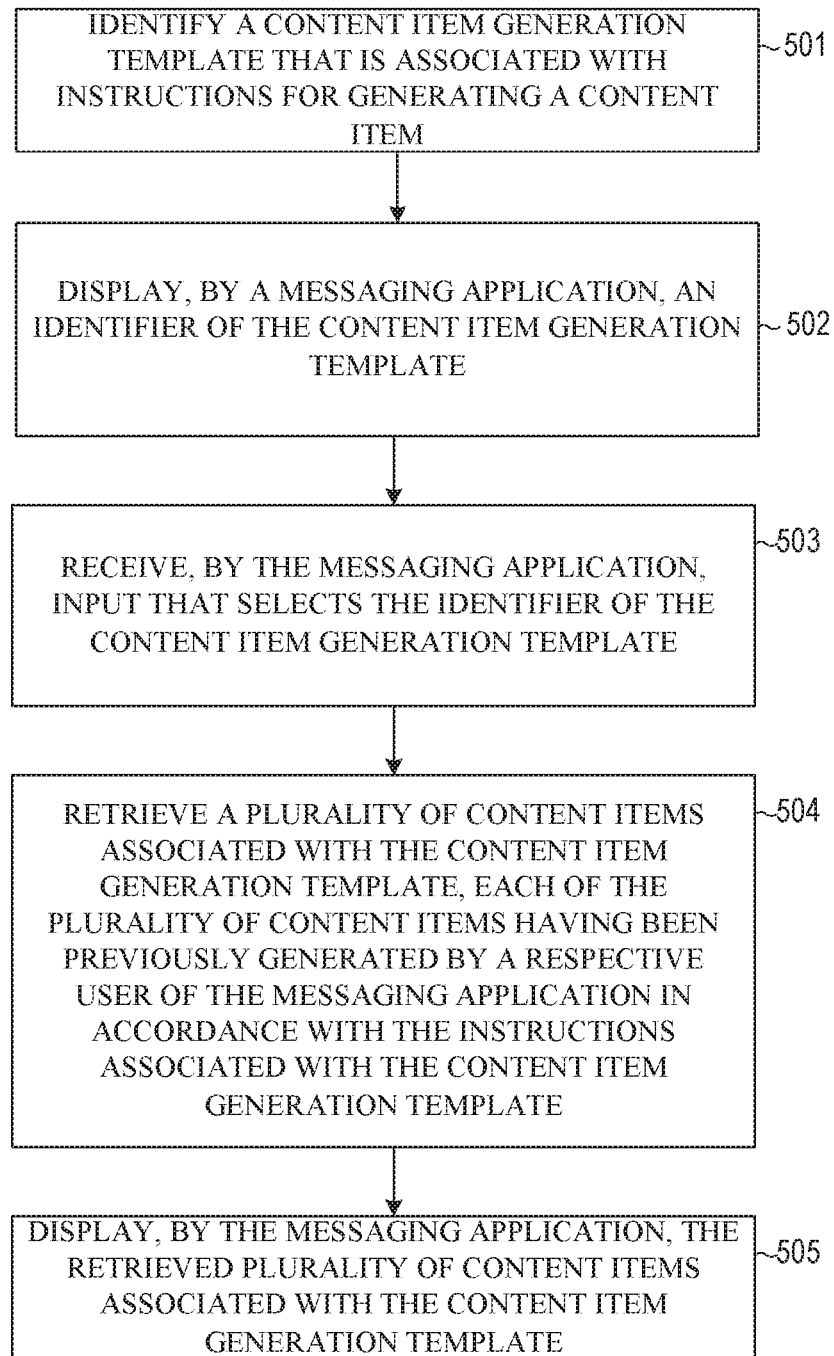
FIG. 5 is a flowchart illustrating example operations of the content item generation template system, according to example embodiments.

FIG. 5 is a flowchart illustrating example operations of the content item generation template system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the content item generation template system 124 identifies a content item generation template that is associated with instructions for generating a content item.

At operation 502, the content item generation template system 124 displays an identifier of the content item generation template.

At operation 503, the content item generation template system 124 receives input that selects the identifier of the content item generation template.

At operation 504, the content item generation template system 124 retrieves a plurality of content items associated with the content item generation template, each of the plurality of content items having been previously generated by a respective user of a plurality of users of the messaging application in accordance with the instructions associated with the content item generation template.

At operation 505, the content item generation template system 124 displays the retrieved plurality of content items associated with the content item generation template.

Figure 6:
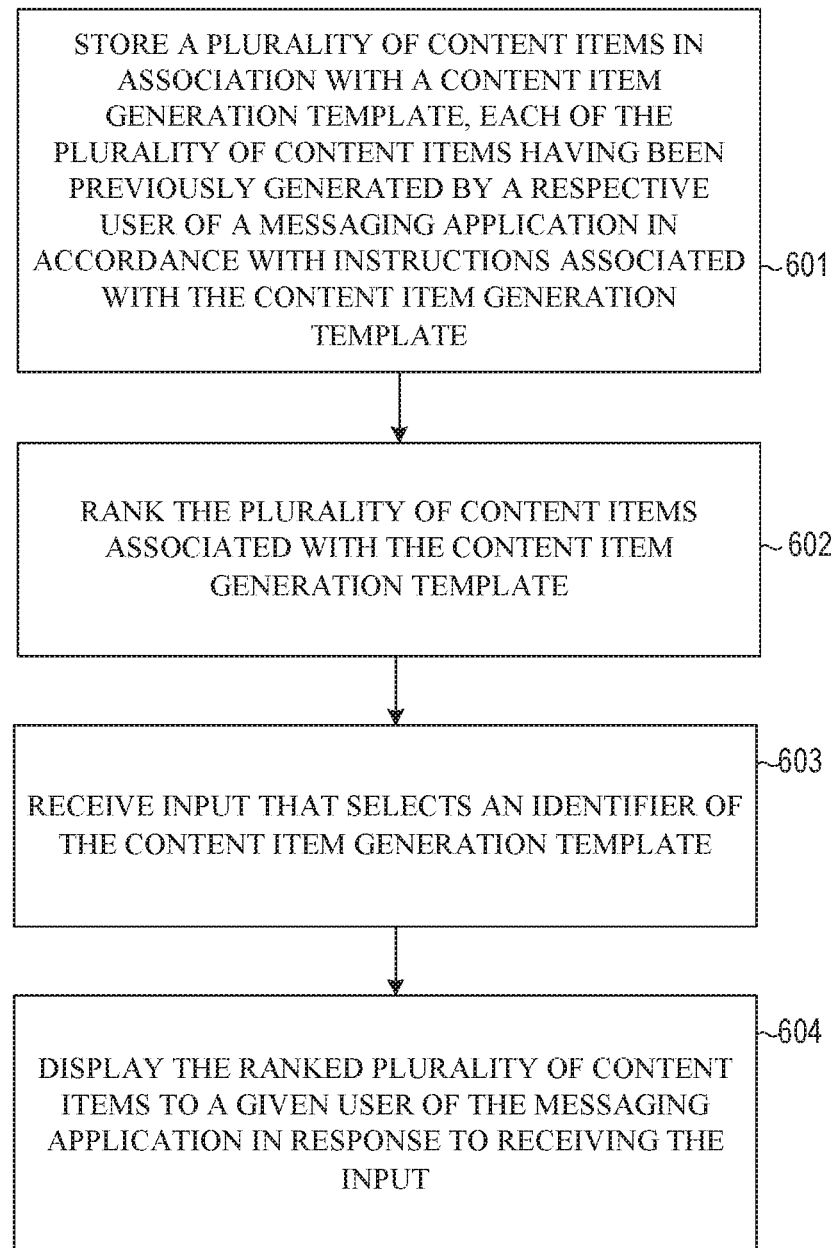
FIG. 6 is a flowchart illustrating example operations of the content item generation template system, according to example embodiments.

FIG. 6 is a flowchart illustrating example operations of the content item generation template system 124 in performing process 600, according to example embodiments. The process 600 may be embodied in computer-readable instructions for execution by one or more processors such that the operations of the process 600 may be performed in part or in whole by the functional components of the messaging server system 108 and/or third-party application 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the content item generation template system 124 stores a plurality of content items in association with a content item generation template, each of the plurality of content items having been previously generated by a respective user of a plurality of users of the messaging application in accordance with instructions associated with the content item generation template.

At operation 602, the content item generation template system 124 ranks the plurality of content items associated with the content item generation template.

At operation 603, the content item generation template system 124 receives input that selects an identifier of the content item generation template.

At operation 604, the content item generation template system 124 displays the ranked plurality of content items to a given user of the messaging application in response to receiving the input.

Figure 7A:
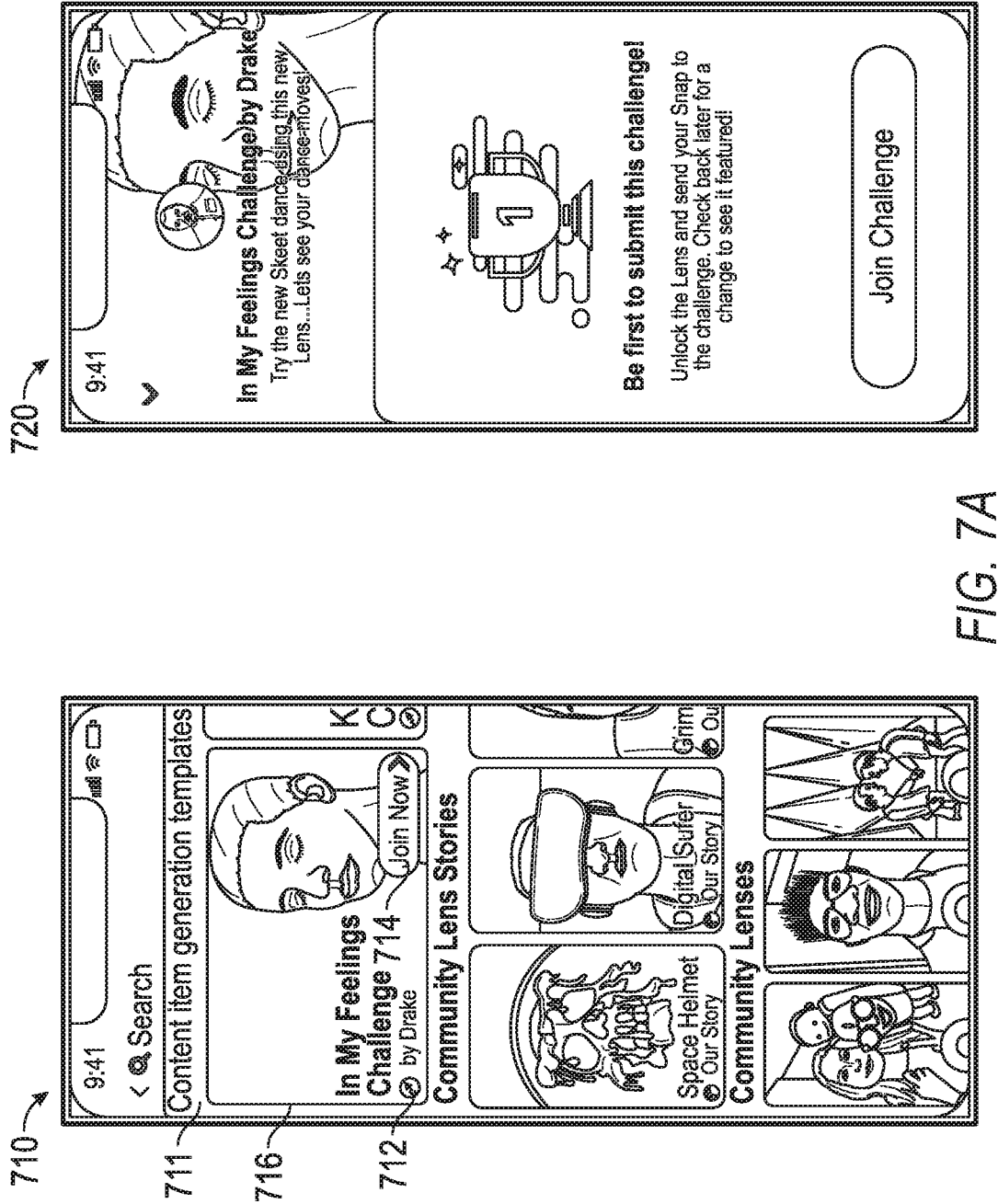
FIGS. 7A-C are illustrative inputs and outputs of the content item generation template system, according to example embodiments.
Figure 7B:
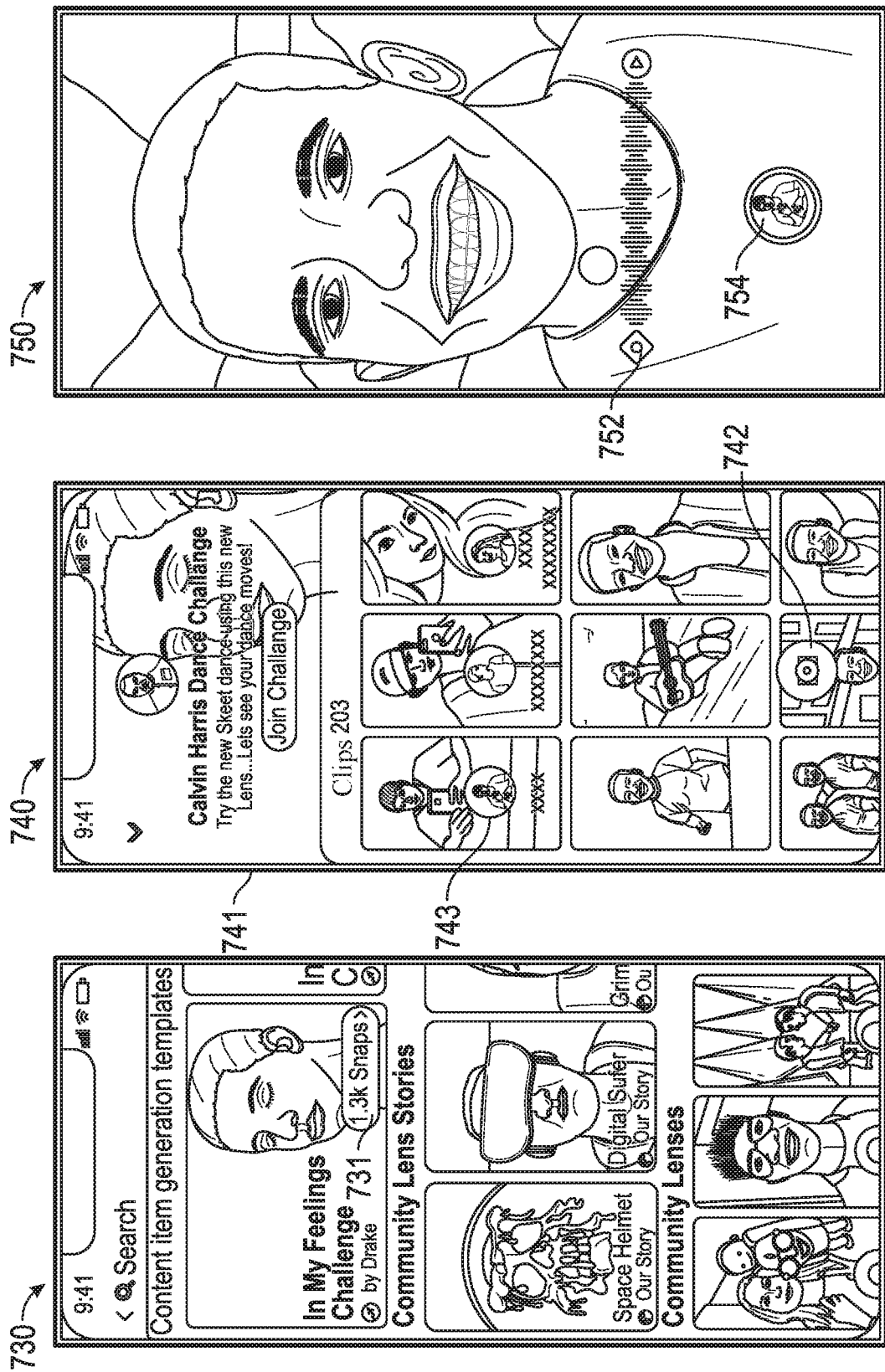
Figure 7C:
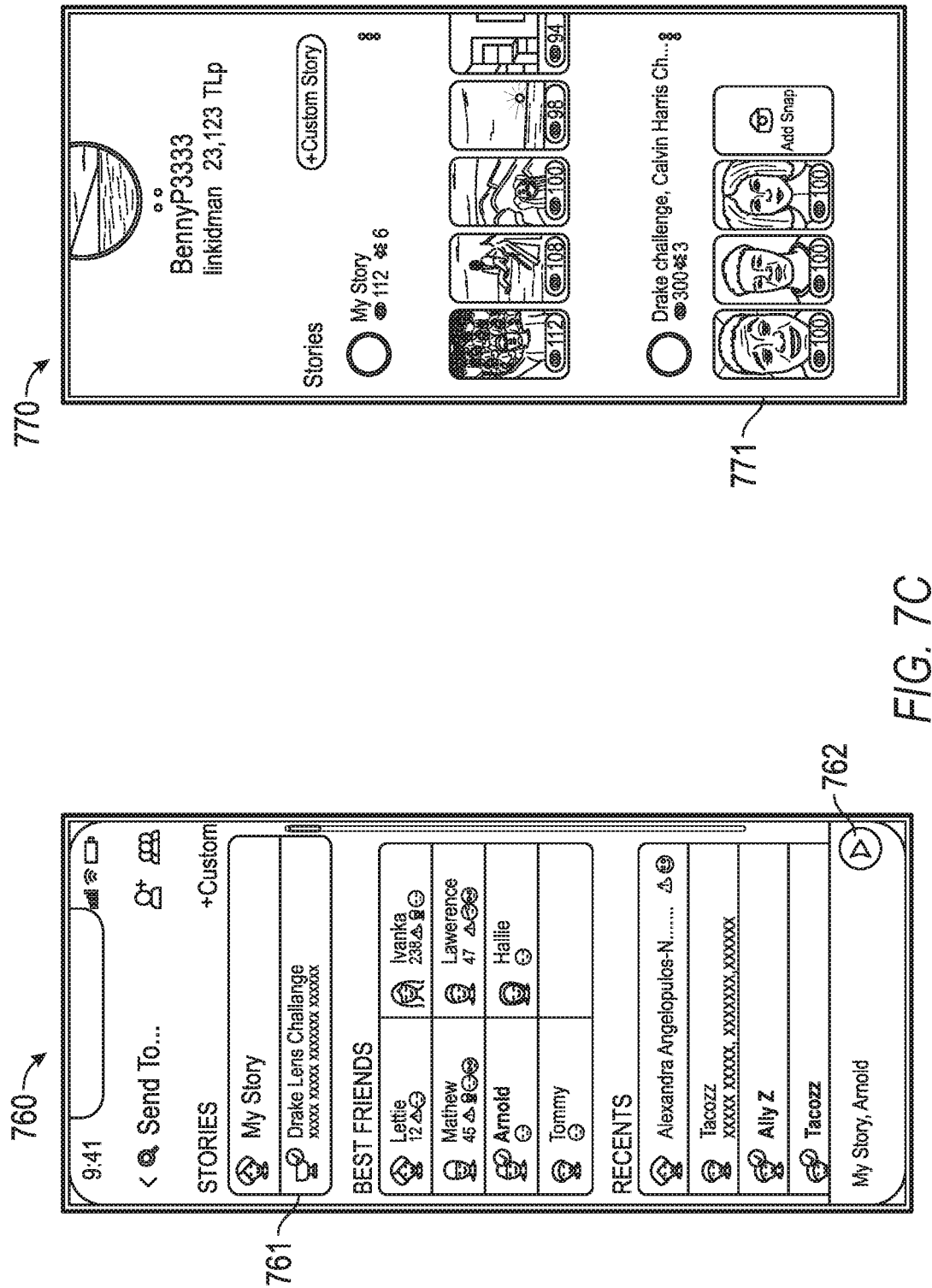

FIGS. 7A-C includes illustrative inputs and outputs of the content item generation template system 124, according to example embodiments. The content item generation template system 124 may present a graphical user interface 710 on a messaging client application 104. The graphical user interface 710 may include a first region 711 dedicated to presenting a list of identifiers of content item generation templates. The graphical user interface 710 may include one or more additional regions dedicated to presenting content items corresponding to different categories.

The first region 711 may present a horizontal list of identifiers of different content item generation templates. The user can swipe left/right to navigate through the list of content item generation templates. A first content item generation template 716 may graphically represent a theme associated with the first content item generation template 716. The first content item generation template 716 may display an album cover or other identifier of the artist who provided or generated the first content item generation template 716. Each template identifier in the first region 711 may include a symbol 712 that specifically indicates that the template is a content item generation template. This symbol helps the user distinguish between content item generation templates and other types of augmented reality content that a user can use to generate content.

The content item generation template system 124 may present a join now option 714 in the first content item generation template 716 to allow a user to submit content or generate content according to the instructions of the first content item generation template 716. In some embodiments, the join now option 714 is presented only if the content item generation template system 124 determines that less than a threshold number of content items have been submitted and created by users for the first content item generation template 716. Namely, the content item generation template system 124 may count how many content items are associated with the first content item generation template 716 and may retrieve a threshold number associated with the first content item generation template 716. If the number of content items associated with the first content item generation template 716 is less than the retrieved threshold number, the content item generation template system 124 presents the join now option 714. If the number of content items associated with the first content item generation template 716 is greater than or equal to the retrieved threshold number, the content item generation template system 124 presents the number of content items 731 in a graphical user interface 730 (FIG. 7B).

In some embodiments, the form and format of the number of content item 731 may depend on the quantity of content items. For example, if the number of content items is between 999-99999, the full number is presented with a comma (e.g., 26368 is presented as 26,368). If the number of content items is between 100000-999999, one decimal point is shown for the thousands place and a K is added (e.g., 782345 is presented as 782.3K). If the number of content items is greater than 1000000, two decimals are shown for the hundred thousands and thousands place and an M is added (e.g., 4568097 is presented as 4.57M).

The user can tap anywhere within the displayed identifier of the first content item generation template 716 but not on the join now option 714 to view additional details about the template. For example, if the user taps on the region in which a title of the first content item generation template 716 is displayed, the content item generation template system 124 presents a graphical user interface 720. Graphical user interface 720 provides a detailed description or summary of the instructions associated with the first content item generation template 716. Graphical user interface 720 includes a join option to allow the user to submit content or generate content according to the instructions of the first content item generation template 716.

In some cases, selection of the join option may automatically activate the template and a camera feed of the user device. Once the template is activated, instructions of the template are presented to the user (e.g., lyrics of a song) and the camera feed begins being captured and stored. In some implementations, selection of the join option launches a camera feed and a summary of the selected content item generation template. The user can select a launch or start option to see the instructions for the template and/or begin capturing a video according to the augmented reality content of the template.

In some embodiments, the content item generation template system 124 may determine that less than a threshold number of content items have previously been generated according to the first content item generation template 716. In such cases, the content item generation template system 124 may present an alert to the user or prompt or message indicating to the user that the user can be the first person to generate content according to the first content item generation template 716. The prompt or message may include a join option to allow the user to submit content or generate content according to the instructions of the first content item generation template 716.

In graphical user interface 730, if the user taps or selects the number of content items 731 that is shown in the identifier of the first content item generation template 716, the content item generation template system 124 presents the user with graphical user interface 740. Graphical user interface 740 includes a region 741 in which a set or collection of identifiers of content items associated with the first content item generation template 716 is presented. In some embodiments, a given one of the identifiers of the content items includes a representation 743 of the user who submitted or generated the given content item associated with the identifier. The representation 743 may be an avatar or picture of the user. In some cases, the graphical user interface 730 may only present representations 743 for users who have been determined by the content item ranking module 418 to be popular. For example, the content item ranking module 418 determines popularity of the users who submitted content items by looking at how active the user is on the messaging client application 104, the number of followers the user has, and/or the number of friends of the user. The content item ranking module 418 ranks content items of users who have a popularity rating that exceeds a given threshold higher than other users who have a lower popularity rating. As a result, the content items of the popular users are presented at the top of the collection of content items in graphical user interface 730. In addition, the representation 743 (e.g., a name or avatar) of such users who have been determined to be popular and who submitted the content items to the collection for the content item generation template are included for the identifiers of the content items submitted by the popular users but the representation 743 is not included for content items submitted by non-popular users.

The user can select any of the identifiers of the content items to view or playback the content item associated with the selected identifier that was generated using the first content item generation template 716. In some embodiments, after selecting a first identifier of the content item associated with the first content item generation template 716, the content item generation template system 124 presents the video associated with the selected first identifier. When playback of the video completes, the content item generation template system 124 automatically retrieves and plays back the next video associated with the next identifier in the set or collection of identifiers. In some cases, when playback of the video completes, the content item generation template system 124 returns the user to the graphical user interface 730 in which the collection or set of identifiers of the content items associated with the first content item generation template 716 is presented.

In some embodiments, the set or collection of identifiers of content items associated with the first content item generation template 716 is ranked according to one or more factors. For example, the set or collection of identifiers of content items associated with the first content item generation template 716 is ranked based on an order determined by the content item ranking module 418.

The graphical user interface 740 includes a camera option 742. The camera option 742 is overlaid on top of a portion of the set or collection of identifiers of content items associated with the first content item generation template 716. In response to receiving a user selection of the camera option 742, the content item generation template system 124 retrieves the instructions corresponding to the first content item generation template 716 and activates the template. Specifically, in response to receiving the user selection of the camera option 742, the content item generation template system 124 presents the user with a camera feed screen 750 and/or presents instructions corresponding to the first content item generation template 716 for which the content items are presented in screen 760. The camera option 742 allows the user to join or generate content, using the first content item generation template 716, for submission to the collection and/or to share with one or more designated recipients.

In some implementations, the first content item generation template 716 includes a music track. In such cases, in response to receiving a user selection of the camera option 742, the content item generation template system 124 presents a graphical user interface screen 750. Screen 750 presents an image of the artist who created the template and the song. The content item generation template system 124 does not launch a camera feed or activate the camera in this case. The content item generation template system 124 begins playing back the music track associated with the first content item generation template 716. The music track includes a vocal portion and an instrumental portion. The content item generation template system 124 presents a slicer tool 752 to allow the user to select a specific portion of the music track. The user can then replace the vocal portion but not the instrumental portion in the selected portion of the music track with an audio recording of the user's voice. Once the user completes recording over the music track, an option is presented to the user allowing the user to share the content item with one or more designated recipients and/or to add the content item to the collection of content items associated with the first content item generation template 716. In some cases, an icon 754 providing attribution to the artist is generated in response to the user recording over a portion of the music track. This icon 754 may be moved around the screen and placed on other content items (e.g., images or videos) captured by the user but may not be removed. In some implementations, the user can add other graphical elements or content items to the content item that the user created with the music track.

In some embodiments, after a user creates a content item using a content item generation template, the content item generation template system 124 presents a graphical user interface screen 760. The graphical user interface screen 760 includes one or more options for allowing the user to share the content item with other users of the messaging client application 104. For example, the graphical user interface screen 760 includes a first option 761 that represents the first content item generation template 716. The first option 761 may describe the first content item generation template 716 and include a title and/or graphical image of the template. The user can check or uncheck (select or deselect) the first option 761 to add or exclude submission of the content item to the collection of content items associated with the first content item generation template 716. In some embodiments, if a content item is added to the first content item generation template 716, any user of the messaging client application 104 is allowed to access the content item. The user can also select one or more friends in the screen 760 to whom to send the content item. After the user selects or deselects the first option 761 and/or specifies one or more friends in screen 760, the user can select the send option 762. In response to receiving a user selection of the send option 762, the content item generation template system 124 automatically and simultaneously sends the content item to the one or more friends who the user selected and/or adds the content item to the collection of content items associated with the first content item generation template 716 (if the first option 761 was selected).

In some embodiments, the content item generation template system 124 presents a graphical user interface screen 770 in response to receiving a user request to access a profile of the user. The screen 770 includes a list of content items the user has shared with other users. The screen 770 includes a dedicated portion 771 that presents a collection of content items associated with a particular content item generation template. The dedicated portion 771 only presents the collection of content items associated with a content item generation template to which the user has previously added a content item. For example, content item generation template system 124 may include first and second content item generation templates. The content item generation template system 124 may determine that the user has previously selected an identifier of the first content item generation template 716, generated content item using the first content item generation template 716, and added the content item to the first content item generation template 716 (e.g., by selecting first option 761). In response, the content item generation template system 124 may add the first content item generation template 716 information to the dedicated portion 771. In response to determining that the user did not select or add content items to the second content item generation template, the content item generation template system 124 may exclude the second content item generation template information from the dedicated portion 771.

In some embodiments, the user may add a particular content item generation template to a favorites list without adding a content item to a collection associated with the particular content item generation template. In such cases, the particular content item generation template that has been added to a favorites list is also included in the dedicated portion 771. In some embodiments, each content item generation template that is listed in dedicated portion 771 includes a list of identifiers of content items that are in a collection associated with the corresponding content item generation template. The list of identifiers is selectable such that any given identifier can be selected to view or access the corresponding content item in the collection. Each identifier in the list may include an indication of the number of views of the corresponding content item. The dedicated portion 771 may include a number of views in aggregate of the content item generation template. The dedicated portion 771 may include an add option for each content item generation template that is included in the dedicated portion 771. In response to receiving a user selection of the add option, the content item generation template system 124 activates the corresponding content item generation template to allow the user to generate a content item using the template.

In some embodiments, the dedicated portion 771 may display a first collection of content items associated with the first content item generation template 716 above a second collection of content items associated with a second content item generation template. Each collection may be identified by the title of the corresponding template. The user can navigate through the templates by swiping up/down. The user can navigate through the content item identifiers in the collection of content items for a given template by swiping left/right.

Figure 8:
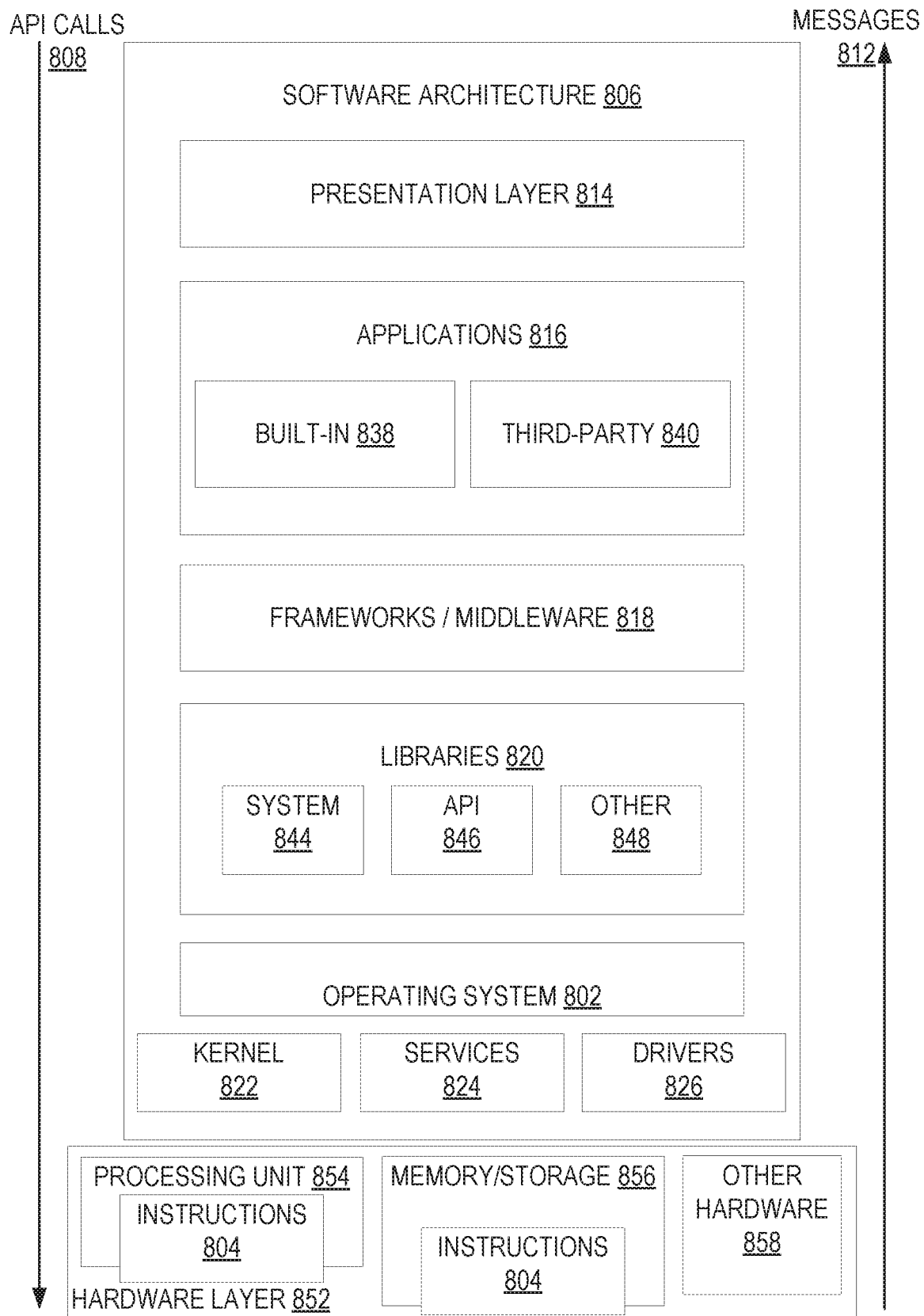
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
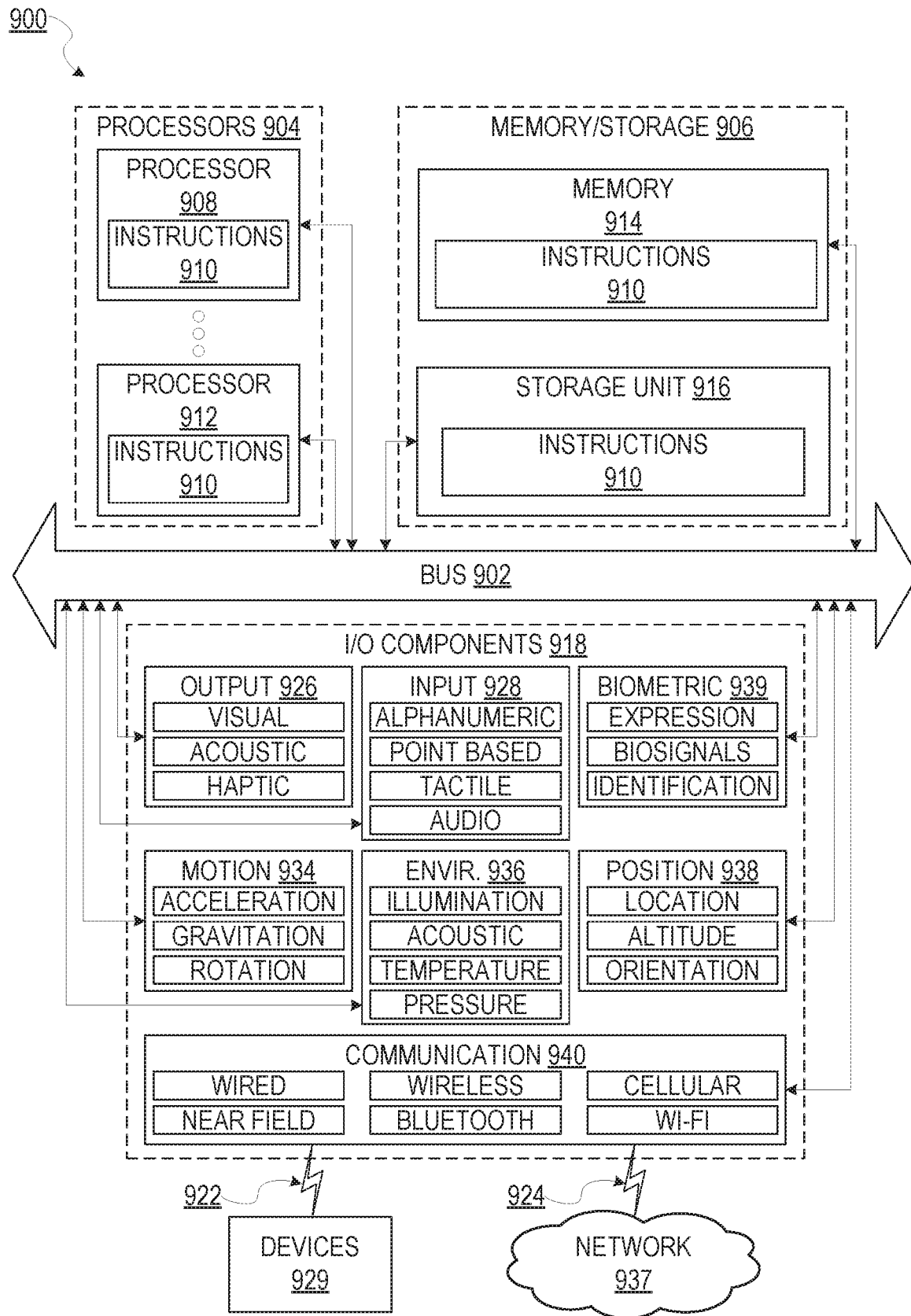
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and 110 components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions 910 contemporaneously. Although FIG. 9 shows multiple processors 904, the machine 900 may include a single processor 908 with a single core, a single processor 908 with multiple cores e.g., a multi-core processor), multiple processors 908, 912 with a single core, multiple processors 908, 912 with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 929 may be another machine 900 or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

Glossary:

"CARRIER SIGNAL," in this context, refers to any intangible medium that is capable of storing, encoding, or carrying transitory or non-transitory instructions 910 for execution by the machine 900, and includes digital or analog communications signals or other intangible medium to facilitate communication of such instructions 910. Instructions 910 may be transmitted or received over the network 106 using a transitory or non-transitory transmission medium via a network interface device and using any one of a number of well-known transfer protocols.

"CLIENT DEVICE," in this context, refers to any machine 900 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 908 or other programmable processor. Once configured by such software, hardware components become specific machines (or specific components of a machine 900) uniquely tailored to perform the configured functions and are no longer general-purpose processors 908. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 908 configured by software to become a special-purpose processor, the general-purpose processor 908 may be configured as respectively different special-purpose processors (e.g., comprising different hardware components) at different times. Software accordingly configures a particular processor 908 or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor 908 or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 106 (e.g., the Internet) and via one or more appropriate interfaces (e.g., an API). The performance of certain of the operations may be distributed among the processors, not only residing within a single machine 900, but deployed across a number of machines. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR," in this context, refers to any circuit or virtual circuit (a physical circuit emulated by logic executing on an actual processor 908) that manipulates data values according to control signals (e.g., "commands," "op codes," "machine code," etc.) and which produces corresponding output signals that are applied to operate a machine 900. A processor 908 may, for example, be a CPU, a RISC processor, a CISC processor, a GPU, a DSP, an ASIC, a RFIC or any combination thereof. A processor 908 may further be a multi-core processor having two or more independent processors 904 (sometimes referred to as "cores") that may execute instructions 910 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
storing, by one or more processors, a plurality of content items in association with a content item generation template, each of the plurality of content items having been previously generated by a respective user of a plurality of users of a messaging application in accordance with instructions associated with the content item generation template;
ranking the plurality of content items associated with the content item generation template;
receiving input that selects an identifier of the content item generation template;
displaying the ranked plurality of content items to a given user of the messaging application in response to receiving the input;
displaying an identifier of the user who generated each respective one of the displayed plurality of content items associated with the content item generation template;
displaying a camera icon together with the displayed plurality of content items; and
launching the content item generation template to allow a user to generate content using the displayed plurality of content items in response to receiving a user selection of the camera icon.

2. The method of claim 1, further comprising:
establishing a first authentication session based on first authentication credentials, the first authentication credentials indicating administrative privileges; and
displaying a configuration user interface within the first authenticated session, the configuration user interface configured to receive input parameters defining the instructions associated with the content item generation template.

3. The method of claim 2, wherein the input parameters include one or more of a period of time during which content will be collected from users, one or more conditions for ending collection of content, an image to be displayed when a user views the content item generation template, a music or video asset to present as part of generating the content item, and a trigger to modify one or more graphics presented during generation of the content item according to designated time points.

4. The method of claim 1, wherein the plurality of content items are ranked based on a relationship between a user who submitted the plurality of content items and a user viewing the plurality of content items.

5. The method of claim 1, wherein the plurality of content items are ranked based on a number of user-generated content items associated with the content item generation template.

6. The method of claim 1, further comprising:
receiving a given content item that was generated using the content item generation template;
receiving input from a moderator that confirms that the given content item matches the instructions associated with the content item generation template; and
assigning a manual rank by a moderator to the given content item.

7. The method of claim 6, further comprising:
retrieving engagement signals associated with the given content item; and
generating a rank for the given content item based on a combination of the engagement signals and the manual rank.

8. The method of claim 7, wherein the engagement signals include at least one of a number of times the given content item has been viewed by users of the messaging application, length of time the users spend viewing the given content item, a geographical location of the users who view the given content item, or how recently the given content item was received.

9. The method of claim 1, further comprising:
receiving a user request to generate a content item using the content item generation template;
displaying the instructions associated with the content item generation template in response to receiving the user request;
displaying a camera feed of a user device together with augmented reality content associated with the content item generation template; and
generating a user generated content item using the displayed camera feed and augmented reality content.

10. The method of claim 9, wherein the augmented reality content includes at least one of a graphical element, music, video, or text, wherein a music track associated with the content item generation template plays while generating the user generated content item; and
wherein a slice tool is presented that allows the user to specify a portion of the music track over which audio of the user is captured to replace the portion of the music track.

11. The method of claim 9, wherein the content item generation template is associated with a time interval having a start and end time, further comprising:
receiving a user request to start generating the user generated content item;
activating the content item generation template to cause one or more items of the augmented reality content to be presented according to a timed sequence within the time interval; and
while the content item generation template is activated, capturing video from the camera feed together with the presented one or more items, wherein the capturing of the video ends automatically when the end time of the time interval is reached.

12. The method of claim 9, wherein the instructions are displayed while the user generated content item is being created and are excluded from the user generated content item after the user generated content item is created, further comprising:
providing a first option for the user to share the generated user generated content item with one or more friends; and
providing a second option for the user to enable access to the generated user generated content item by any user of the messaging application who selects an identifier of the content item generation template.

13. The method of claim 1, wherein an identifier of the content item generation template includes a symbol representing content item generation templates, wherein the identifier includes a new indicator and a join now option when no content items have previously been generated using the content item generation template, and wherein the identifier includes a view option that represents how many content items are associated with the content item generation template when a threshold number of content items have previously been generated using the content item generation template, the view option causing the previously generated content items to be presented when selected by a user.

14. The method of claim 1, wherein an identifier of the content item generation template represents a producer or artist associated with the content item generation template.

15. The method of claim 1, wherein the instructions instruct a user to perform a specific action while generating a video clip.

16. The method of claim 1, wherein the content item generation template is associated with a start date and an end date, wherein the generating content using the content item generation template is enabled after the start date and before the end date.

17. The method of claim 1, further comprising displaying, by the messaging application, a plurality of identifiers of content item generation templates horizontally, wherein the plurality of identifiers are navigable by swiping left and right.

18. A system comprising a hardware processor configured to perform operations comprising:
storing a plurality of content items in association with a content item generation template, each of the plurality of content items having been previously generated by a respective user of a plurality of users of a messaging application in accordance with instructions associated with the content item generation template;
ranking the plurality of content items associated with the content item generation template;
receiving input that selects an identifier of the content item generation template;
displaying the ranked plurality of content items to a given user of the messaging application in response to receiving the input; displaying an identifier of the user who generated each respective one of the displayed plurality of content items associated with the content item generation template;
displaying a camera icon together with the displayed plurality of content items, and
launching the content item generation template to allow a user to generate content using the displayed plurality of content items in response to receiving a user selection of the camera icon.

19. A non-transitory machine-readable storage medium that includes instructions that, when executed by one or more processors of a machine, cause the machine to perform operations comprising:
storing a plurality of content items in association with a content item generation template, each of the plurality of content items having been previously generated by a respective user of a plurality of users of a messaging application in accordance with instructions associated with the content item generation template;
ranking the plurality of content items associated with the content item generation template;
receiving input that selects an identifier of the content item generation template;

displaying the ranked plurality of content items to a given user of the messaging application in response to receiving the input; displaying an identifier of the user who generated each respective one of the displayed plurality of content items associated with the content item generation template;

displaying a camera icon together with the displayed plurality of content items, and launching the content item generation template to allow a user to generate content using the displayed plurality of content items in response to receiving a user selection of the camera icon.

\* \* \* \* \*